United States Patent [19]

Paris et al.

[11] 4,360,506

[45] Nov. 23, 1982

[54] METHOD OF PREPARING SIALON PRODUCTS

[75] Inventors: René A. Paris, Lyons; Thérèse Grollier-Baron, Ecully, both of France

[73] Assignee: Societe Europeenne des Produits Refractaires, Neuilly-sur-Seine, France

[21] Appl. No.: 173,746

[22] Filed: Jul. 30, 1980

[30] Foreign Application Priority Data

Aug. 3, 1979 [FR] France .................................. 79 19986

[51] Int. Cl.³ ...................... C01B 33/26; C04B 35/58; C04B 35/64
[52] U.S. Cl. ..................................... 423/327; 264/56; 264/59; 264/65; 501/100; 501/128
[58] Field of Search ................. 423/327; 106/65, 73.4, 106/73.5; 264/56, 59, 65

[56] References Cited

U.S. PATENT DOCUMENTS

| | | | |
|---|---|---|---|
| 3,960,581 | 6/1976 | Cutler | 106/65 |
| 3,991,148 | 11/1976 | Lumby et al. | 106/65 X |
| 3,991,166 | 11/1976 | Jack et al. | 423/327 |

*Primary Examiner*—Edward J. Meros
*Attorney, Agent, or Firm*—Watson, Cole, Grindle & Watson

[57] ABSTRACT

The invention relates to a method of preparing a product containing, as a single crystalline phase, a solid solution or $\beta'$-sialon type having the general formula $Si_{6-Z} Al_Z O_Z N_{8-Z}$ where $Z=1$ to 4, which comprises heating in a nitrogen atmosphere, at 1400°–1600° C., agglomerated elements obtained by drying a paste comprising a silico-aluminous material, such as kaolinitic clay, carbon, and a pore-generating agent comprised of fine particles of a ligneous material, such as sawdust or a powder of olive stones.

12 Claims, 1 Drawing Figure

U.S. Patent
Nov. 23, 1982
4,360,506
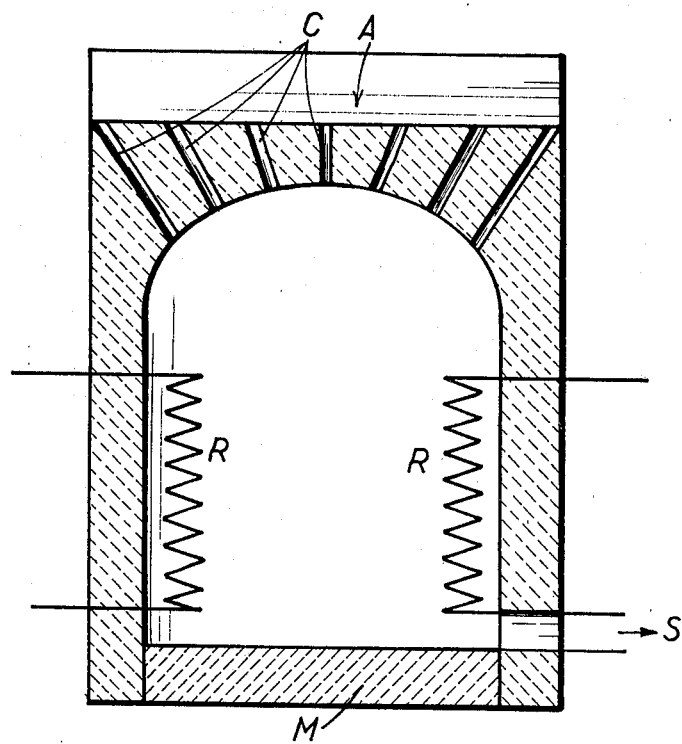

METHOD OF PREPARING SIALON PRODUCTS

BACKGROUND OF THE INVENTION

The invention concerns "sialons", i.e., homogeneous solid solutions of the Si-Al-O-N system, and it more particularly concerns a method of preparing $\beta'$-sialons.

Over the past fifteen years many studies have demonstrated the advantage of silicon nitride as a refractory material, it being resistant to both high temperatures and to corrosion by many chemical agents. The principal difficulty in forming such a compound by hot pressing is that it is not compactable in the pure state but has to have a certain amount of an oxide such as MgO added to it, so as to form a vitreous phase during hot pressing. In 1972 a significant advance was made in the preparation of ceramic products with a silicon nitride base by subjecting mixtures of this nitride with alumina to hot pressing i.e., was found because it possible to form a solid solution with these two constituents over a large range of compositions (from 0 to 60 moles % $Al_2O_3$).

In actual fact, according to recently published works, in particular thereto L. J. GAUCKLER, H. L. LUCAS and G. PETZOW in J. Amer. Ceram. Soc. 58-346 (1975) and K. H. JACK in J. Mat. Sci. 11-1135 (1976), the homogeneous solid solutions which can be formed in the Si-Al-O-N system are relatively numerous and correspond to various compositions and structures. Among these are the products obtained by reaction of silicon nitride $Si_3N_4$ with aluminium nitride AlN and alumina $Al_2O_3$, in equimolar proportions, i.e., $Al_3NO_3$, constituting homogeneous crystals with the general formula $Si_{6-z}Al_zO_zN_{8-z}$ with the same structure as $\beta$ silicon nitride and usually denoted by the same $\beta'$-sialon. The region of existence of such a solid solution is relatively large since the value of Z can vary in practice in a continuous manner from 0 to about 4.2. Due to the good sintering quality, with or without pressure, of these $\beta'$ sialons, and because of the very advantageous characteristics of the ceramic materials thus obtained (refractoriness, heat resistance, resistance to corrosion, to oxidation, etc.), very many studies have understandably been devoted to them for some years. What, however, seems to limit the possibilities of application of such a material is its current cost. This cost is high, both because of the cost of the raw materials used, especially silicon nitride and aluminium nitride, and because of the expense of the sintering operation for forming the solid solution by reaction of the phases together. The sintering operation can be carried out by subjecting an intimate mixture of the powders which have an appropriate granulometry to pressing at 200 to 250 kg/cm² at temperatures of between 1600° and 1750° C. for 30 to 60 minutes.

This hot pressing technique, which is both expensive and unsuitable for manufacturing parts with complex shapes, can be replaced by a technique of sintering without pressure, which is cheaper, consisting in first compacting the mixture of powders while cold, under a pressure of 7 T/cm² (for example) and then holding the compacted product at between 1750° and 1780° C. for 2 hours in a nitrogen atmosphere.

To produce $\beta'$ sialons in a way which is cheaper than the techniques just described, authors have proposed utilizing less expensive raw materials than nitrides, by subjecting a natural or synthetic silicate of aluminium to a "nitriding" reaction.

Thus, in a recent publication (see J. Mat. Sci. 11-P. 1972 (1976)) S. WILD discloses obtaining $\beta'$ sialon powders by nitriding, with a mixture of ammonia and hydrogen, a finely divided powder with a large surface area of metakaolin obtained by dehydration of kaolin at 500° C. The product formed after 24 hours of treatment at 1400° C. is constituted by a mixture of $\beta'$ sialon and aluminium nitride AlN. The latter compound can be removed by treating the powder with a solution of 2.5% caustic soda NaOH for 30 minutes at 60° C. This method is limited to the product of small quantities of sialon powder (about 0.2 g by experiment) because of the difficulty in obtaining satisfactory contact between the nitriding gas (ammonia) and the grains of the powder. In addition, this process of nitriding metakaolin with ammonia or $NH_3/H_2$ mixtures allows only $\beta'$ sialons which are poor in Al (Z<1.83) to be obtained. Since the Si/Al ratio in the starting kaolin should lead to Z=3, it is deduced that a high proportion of aluminium is found in the final product in the nitride state AlN, which necessitates purifying the sialon by the caustic soda treatment, as indicated above.

Preceding WILD's publication, U.S. Pat. No. 3,960,581 to Ivan B. CUTLER disclosed the production of sialon from clay. In fact, in the experiments described to illustrate this invention and which consist in "nitriding" with nitrogen in the presence of carbon, either rice husk (source of silica) and hydrated aluminium chloride (source of alumina), or clay expanded with polyurethane foam, or co-precipitated silicates of alumina, an "intimate dispersion" of alumina and silicon nitride is finally obtained, because the durations indicated for the nitriding stage (3 to 4 hours at 1400° C.) are too short for the true solid solution of the two phases to be formed, i.e., the homogeneous phase termed sialon. Moreover, as the invention specifies, the solid solution, i.e., the sialon, can only be obtained by subjecting the compacted powder to sintering in nitrogen at between 1300° C. and 1900° C.

Following this patent, at the meeting of October 3rd, 1975, of the American Ceramic Society, Mr. J. G. LEE, Mr. R. CASARINI and Mr. I. B. CUTLER presented a paper on the obtaining of sialon from clay; according to these authors, the nitriding of clay in the presence of carbon is carried out in a nitrogen atmosphere at 1450° C. with iron as catalyst. The powder obtained, pressed and sintered in a nitrogen atmosphere (1 hour at 1550°–1650° C.) produces compact products whose density is a function of the sintering temperature (3.01 for 1550° C.; 3.03 for 1600° C.; 3.14 for 1650° C.). Under metallographic analysis, these products, which are difficult to polish, show a dispersion of ferrosilicon in relatively significant quantity in the solid solution studied. It should be observed that in these experiments, in which, from measurement of the loss of weight, the nitriding was total at 1450° C. in less than one hour, it is probable that at the end of so short a time the sialon solid solution is not more developed than in those described in the CUTLER patent and that "an intimate dispersion" of alumina and silicon nitride is again involved.

The current state of the technique for making sialons from kaolin or kaolinitic clays presents some disadvantages.

1. According to the publications mentioned above, it appears that none of the proposed techniques allows the sialon solid solution to be obtained in the state of a pure phase. The heterogeneous powders obtained according to the WILD method contain a considerable amount of aluminium nitride in addition to the solid solution which is relatively poor in aluminium.

The operations described in the works of CUTLER and al. produce dispersions of silicon nitride and alumina which are not sialons and which must be subsequently sintered at a higher temperature to produce the sialon phase. Furthermore, these sintered products contain a ferrosilicon phase when the nitriding reaction has been catalyzed by iron.

2. The nitriding operation carried out on powdery products transfers with great difficulty to an industrial scale. It can certainly be carried out on a thin layer of powder so that all the grains can be in contact with the gaseous phase constituting the nitriding agent but becomes impossible with a large mass of powder, only a small surface portion of which is in contact with the gaseous phase. The solution of using a fluidized bed which allows sufficient mixing of the whole of the powder with the nitriding gas seems an especially difficult application to the man of the art, due to the temperature at which nitriding is carried out.

The object of the present invention is to provide a new method of making $\beta'$ sialons presenting the double advantage, over the methods previously described, of using only very cheap raw materials and simple and inexpensive operating conditions, and also of being capable of being carried out with quantities of material which can be as large as required, i.e., it transfers very well to industrial production scale.

SUMMARY OF THE INVENTION

More precisely, the invention concerns a method of preparing a product containing, as a single crystalline phase, a solid solution of $\beta'$ sialon type having the general formula $Si_{6-Z} Al_Z N_{8-Z} O_Z$ where $Z=1$ to 4 by heating in a nitrogen atmosphere, to temperatures in the range from 1400° C. to 1600° C., agglomerated elements obtained by drying a paste comprising a silico-aluminous material, carbon and fine particles of a ligneous material as a pore-generating agent.

The invention also concerns the $\beta'$ sialon product obtained by the method of the invention, in particular crushed to the powder state, as well as articles formed from this product.

The duration of heating necessary for obtaining the product of the invention will of course vary as a function of the temperature applied; the higher the temperature, the shorter the duration. In general, the duration of heating will be between about 9 and 25 hours.

The silico-aluminous material can be a synthetic or natural silicate of alumina such as kaolin, a clay, pyrophillite, etc. An intimate mixture of these materials can also be used.

This silico-aluminous material must be used in the form of a fine powder, with a surface area of at least 5 m$^2$/g, preferably between 5 and 50 m$^2$/g, so as to offer sufficient reactivity.

From several points of view, kaolinitic clay is the preferred material as natural silicate of alumina; first, it is a very cheap product, easily obtained in a powdered state with a large and very reactive surface. This clay has the great advantage of forming with water a plastic paste allowing, with the additions mentioned above, agglomerated masses to be made which retain very good mechanical characteristics after drying and throughout the whole nitriding operation. Furthermore, certain impurities in clay, particularly iron, have a favorable effect on nitriding. These impurities, in relatively small quantities in certain types of clay, are removed during the nitriding reaction (in the case of alkaline impurities) or remain in solution in the formed product. Kaolinitic clay, which has many varieties, gives $\beta'$ sialons with the general formula indicated in which $Z=2$ to 3.

In most applications of the sialons of the invention as refractory materials or constituents of refractory materials, this small quantity of impurities is not particularly disadvantageous. In fact, they can often help to facilitate sintering operations. However, since their adverse effect is evidenced in certain characteristics of sintered products, it is advisable to limit their presence by choosing the purest possible raw materials when these sintered sialons are intended for particularly demanding applications.

Kaolin, which is a purer silicate of alumina, but also more costly than clay, will naturally produce nitrided products containing less impurities than those obtained from clay. However, it should be emphasized that kaolin is less suitable than clay for manufacturing plastic pastes and consequently kaolin-based agglomerates have poor mechanical characteristics which makes handling them in drying and nitriding operations trickier. This is a serious disadvantage when large masses of product are involved in an operation, in industrial manufacture.

In addition to kaolin and kaolinitic clay, of which there are many varieties, the greater whose reactivity, the more easily product the desired solid solution (this reactivity being foreseable from the surface area of the powder), natural or synthetic silico-aluminous materials, having other Si/Al ratios, can also be used to obtain solid solutions presenting formulas with different Z values. In particular a pyrophillite with the formula $Al_2 Si_4 O_{10} (OH)_2$ which contains twice as much silica as kaolinitic clay will allow a sialon to be obtained for which the value of Z is equal to 2, in accordance with the equation for nitriding:

$$Al_2Si_4O_{10}(OH)_2 + 9C + 3N_2 \rightarrow Si_4Al_2N_6O_2 + 9CO + H_2O.$$

The nitriding treatment, carried out on the very many natural materials, which are plentiful and cheap, can produce very differing phases of compositions corresponding to equally diversified applications. The properties of these "impure sialons" are in fact modified by the metal elements which the silico-aluminous starting materials introduce (alkaline-earth, heavy metals). In this broad aspect of the method, however, it should be noted that it is never possible to exactly predict the result of the nitriding of a given material simply on the basis of the composition of this material. The effect of nitrogen, in the presence of carbon, on silicates of alumina is a complex phenomenon, comprising several successive reactions and intermediate compounds, depending on both the composition and the structure of the starting material and on the conditions in which the nitriding operation is carried out. Only experiment can reveal what is obtained when a given material is subjected to a nitriding treatment in given conditions.

Thus, for example, it will be noted (Examples 12 and 13 hereinafter) that an intimate mixture of silica and alumina, in a ratio identical to that of the kaolinitic clay of Example 1 and nitrided in the same conditions as the latter produces a polyphased system comprising $\beta'$ sialon, corundum and possibly silicon oxynitride. Such an observation clearly emphasizes the unexpected and entirely unforeseeable result observed in nitriding the clay; the latter allows the $\beta'$ sialon free from corundum and silicon oxynitride to be obtained more easily than the silica/alumina mixture. This difference in behavior can be attributed to impurities favoring nitriding contained in the clay, to its very fine state and consequently great reactivity and finally, to the fact that the silicate of alumina constituting the clay reacts differently from the non-combined silica/alumina mixture.

The carbon used for making agglomerates subjected to nitriding will preferably be a pure carbon with a high surface area, advantageously greater than 500 m²/g, and consequently having great reactivity, termed carbon black, in its commonest and cheapest quality.

The applicant has established that wood carbon or any other form of more or less graphitized carbon can also be used, as long as they are reduced to very fine powder state by milling. However, though such carbons are cheaper than carbon black, they have the disadvantage of being less reactive and richer in mineral impurities which are found in the finished product.

The pore-generating agent which is incorporated in the silico-aluminous material and carbon to form the paste is formed by fine particles in a ligneous material. This pore-generating agent will be removed from the agglomerate obtained by drying the paste, upon heating the agglomerate at high temperature, which will cause the formation of an open porosity in the agglomerate, allowing the nitrogen to come into contact with the whole mass of the agglomerate and thus allowing a homogeneous and efficient nitriding to be obtained. The term "fine particles" means particles smaller than 1 mm, preferably in the range of 100 microns to 1 mm.

For the purposes of the invention, sawdust is the first of the useful ligneous materials which should be indicated. It has the advantage of being a very cheap waste material and it can be incorporated relatively well in plastic masses with a clay base. It has also seen found that a fine powder resulting from thorough milling of olive stones also gives excellent results and its advantage over sawdust is that it is much easier to incorporate this powder in the mass of clay homogeneously.

The proportion of this heat-removable pore-generating agent must be chosen so that all the particles of the solid agglomerate can be reached by the nitrogen during the whole of the nitriding reaction, i.e., the mass retains a sufficient porosity throughout the whole length of treatment. The pore-generating agent plays an absolutely crucial part in implementing the method of the present invention on a industrial scale. In fact, it is this pore-generating agent which allows large amounts of material to be processed which could not be nitrided without this agent or only very imperfectly in the presence of too small amounts of this agent as is shown by the examples given hereinafter.

The heat-removable materials which have just been mentioned are, of course, carbonaceous substances which produce a carbon residue by pyrolysis in a nitrogen atmosphere. This quantity of carbon which is added to the carbon put in the initial paste must be taken into account in calculating the reagents subjected to the nitriding reaction.

An advantageous modification within the scope of the invention consists in subjecting to nitriding mixtures of clays (or other silico-aluminous materials) and very porous carbon which acts both as carbon source and pore-generating agent.

Such a carbon source, whose cost is less than that of wood carbon, can easily be obtained by coking between 900° and 1000° C. a mixture of coal, sawdust and coal tar as described in French patent No. 1,375,252.

Preparation of the agglomerated elements used in the method of the invention can be carried out as follows:

As intimate and homogeneous a mixture as possible is made from the three above-mentioned materials carefully milled to the fine powder state, i.e., the silico-aluminous product, the carbon and the pore-generating agent. The composition by weight of this mixture depends on the silico-aluminous product, meaning that it must contain a quantity of carbon at least equal to, and preferably slightly greater than, the theoretical quantity as calculated according to the reaction equation:

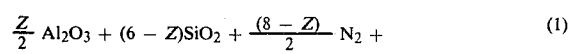
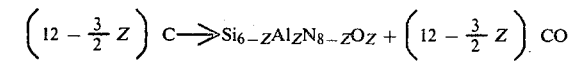

$$\frac{Z}{2} Al_2O_3 + (6 - Z)SiO_2 + \frac{(8 - Z)}{2} N_2 + \left(12 - \frac{3}{2} Z\right) C \longrightarrow Si_{6-Z}Al_ZN_{8-Z}O_Z + \left(12 - \frac{3}{2} Z\right) CO \quad (1)$$

where Z can vary from 1 to 4.

The percentage of heat-removable pore-generating agent can be chosen so that the porosity of the mass subjected to nitriding is sufficient for good access of the gas to all the solid particles. However, if this proportion is too high, the mechanical characteristics of the treated samples are less than ideal because of their excessive porosity. In most cases, the proportion of pore-generating agent between 8 and 18% in weight with respect to the total weight of silico-aluminous material, carbon and pore-generating agent, will be satisfactory.

For illustrating purposes, if a clay is proposed to be treated, for example, with carbon black and sawdust as a pore-generating agent, and assuming this clay to contain 46.2% in weight of SiO₂ and 33.6% in weight of Al₂O₃, the theoretical quantity of carbon necessary for the treatment of 100 g of clay according to the reaction equation (1) being 22.56 g, an excess of carbon will be used of about 20% in weight (namely 5 g) with respect to this quantity. The percentage of sawdust to be added to the mixture can be between 8 and 18%, as indicated hereinbefore. Below 8%, the porosity of the mass subjected to nitriding remains insufficient. For percentages of sawdust greater than 18%, mixing of the clay is carried out with difficulty and the mechanical characteristics of the samples after treatment are bad.

A sufficient quantity of water is added to the mixture of afore-mentioned powdery solids to form a paste from which the elements to be subjected to nitriding will be made. These elements can be of any suitable shape. They can be, for example, cylindrical bars or parallelepiped bricks, formed by light pressing and corresponding, depending on the capacity of the furnaces used for nitriding, to amounts of paste varying from 100 g to several kg per e element.

These elements, in the form of cylindrical bars or parallelipiped bricks, can be treated, for example, in the conditions detailed hereinafter, either in horizontal tubular furnaces (for small cylindrical samples), or in large bell furnaces in which the bricks are piled up in such amounts that several hundred kg can be manufactured per operation.

Before being put in the nitriding furnace, the bars or bricks first undergo a drying operation, for example, in a drying oven at 110° C. for 10 to 12 hours. They are then subjected to the nitriding treatment in a furnace, traversed by a current of dry nitrogen whose flow-rate is a function of the capacity of furnace used.

When a rapid heating furnace is used, the heating operation is generally carried out in two stages: first of all, a regular rise in temperature, for example to about 800° C., this temperature being maintained for 2 to 3 hours to remove the water of constitution of the clay. After this stage, the temperature is steadily raised to at least 1400° C. and 1600° C. at most, preferably to 1500° C., and this temperature is maintained for 9 to 25 hours, preferably for 15 hours. If a slow heating furnace is used, such as a large industrial furnace, it may be unnecessary to carry out the stage indicated, the water of constitution of the clay being removed during the slow rise in temperature of the furnace.

The furnace is then allowed to cool to ambient temperature while the nitrogen atmosphere is maintained.

The load of elements resulting from this nitriding calcination are, after cooling, in the form of very porous bars or bricks which are very easily reduced to powder by crushing. This very homogeneous powder is constituted, as the examples described hereinafter will show, by small grains of $\beta'$ sialon with the formula $Si_{6-z}Al_zN_{8-z}O_z$ with no significant amount of any other crystallized phase detectable by X-rays. The term "significant amount" means an amount greater than 1% in weight. This result demonstrates the advantage of the method of the invention in comparison with the previous methods proposed for obtaining sialons which always result in mixtures of phases, whether hot pressing of mixture of silicon nitride and alumina or the nitriding of kaolin by ammonia are concerned.

The primary role played by the pore-generating agent introduced into the masses treated according to the method of the invention must be emphasized again: the porosity of the mass achieved thereby during the whole treatment allows the gas-solid reaction to be completely carried out in elements with large dimensions as is evidenced by the homogeneity of the powder obtained after crushing of the nitrided elements. As a result, unlike every method described to date for producing sialons, the method of the invention easily adapts to an industrial scale, the production of this sialon being limited only by the capacity of the furnace used.

In the illustrative examples of the method described later, the use of tubular furnaces on laboratory production scale and of a bell furnace for production on semi-industrial scale are described, but it is of course possible to make modifications in these techniques in order to make the method more economical. In particular, the discontinuous operations described hereinbefore can be changed to continuous operations which are generally preferred in industrial use. Thus, continuous nitriding can be carried out in a horizontal tubular furnace (tunnel furnace) in which the masses to be nitrided (cylindrical bars or parallelipiped bricks) are put in at one end of the furnace and pushed towards the other end at a suitable rate. This tunnel furnace, permanently traversed by a suitable flow of nitrogen, is arranged so that different regions of it are kept at temperatures which allow the cycle of the treatment required to be carried out, as indicated above. Although the masses to be nitrided retain relatively good mechanical characteristics throughout nitriding, it is nevertheless useful, in order to avoid them deteriorating through abrasion, to put them on a bed of refractory material which will itself ensure movement of the hearth of the furnace.

Another advantageous possibility for carrying out the continuous nitriding method is using a vertical tubular furnace in which the material to be treated is introduced through the top in the form of spherical balls of 1 to 5 cm diameter, obtained either using a granulator (small balls) or by moulding (for larger balls) from the paste of clay, carbon and pore-generating agent. These balls, previously baked at 110° C., are introduced at the top of the vertical furnace and subjected, during their descent by gravity, to the nitrogen atmosphere with the same heating programme as indicated previously. This vertical furnace of course includes lock-chambers at its top and base for avoiding re-entry of air during charging and discharging operations. This type of vertical furnace can also be fed with small cylinders (of about 2 cm in diameter, over 2 cm in length) or small cubes (of about 2 cm edge) obtained by passing the paste of clay, carbon and pore-generating agent into an extruder provided with an automatic cutter at the outlet of the nozzle which allows the elements to be cut to the required length.

The materials obtained according to the invention, which, as just indicated, can differ greatly from each other in nature, all have a relatively low cost in common because of the low cost of the materials used and the ease with which the nitriding treatment can be carried out on samples of large mass as required under industrial production conditions.

These nitrided materials can be used in the preparation of special refractory materials, either in the unshaped form or as bonded pieces in mixture with other refractory materials or as compact pieces obtained by sintering. The sialon product powders obtained according to the method of the invention can actually undergo a densification operation by sintering them very easily simply by compacting these powders by cold pressing or by slip casting and then by carrying out sintering by heating without pressure.

It is important to note that densification of these powders by sintering is much easier than the usual operation which consists in reacting, at the time of sintering, the powder mixtures, forming the sialon. When powders already formed of grains of sialon are actually subjected to sintering, they sinter very rapidly when their softening temperature is reached. The fact of being able to obtain a sintered product rapidly in this way, at the minimum temperature for softening the grains has the particular advantage of avoiding decomposition of the sialon.

DESCRIPTION OF THE FIGURE

The attached FIGURE shows a cross sectional view through a furnace used in Example 9 described hereinbelow.

EXAMPLES OF THE INVENTION

The non-limiting examples which follow are given to illustrate the invention.

EXAMPLE 1

This first example concerns the nitriding of a kaolinitic clay of large surface area (50 m²/g) having the following composition, expressed in percentages by weight, in the raw state: 46.2% $SiO_2$, 33.6% $Al_2O_3$, 1.75% $Fe_2O_3$, 1.85% $TiO_2$, 0.48% CaO, 0.15% MgO, 0.04% $Na_2O$ and 0.07% $K_2O$. This clay has a loss of 15.3% on firing.

This clay, as a fine powder, is intimately mixed with sawdust and carbon black in the following proportions by weight: 65.2% clay, 18.1% carbon black and 16.7% sawdust. By the addition of about 30% water to this mixture, a paste is formed which is very carefully milled and formed, simply by hand, into a cylinder 1.5 in diameter and 5 cm in length. This cylindrical bar is dried in the drying oven at 110° C. for 12 hours and then placed in a tube of sintered alumina heated by a tubular furnace with rods of silicon carbide allowing a maximum temperature of 1450° C. to be reached at the site of the bar.

The nitriding operation carried out on this bar by a current of pure and dry nitrogen (flow-rate 30 l/h) has two stages:

1. a regular rise (120° C./h) from the ambient temperature to 800° C. and maintaining of the temperature at 800° C. for 3 hours to completely dehydrate the clay, 2. a regular rise (120° C./h) in temperature from 800° C. to 1400° C. and maintaining of this temperature for 25 hours. The supply current of the furnace is then cut off while the flow of nitrogen is maintained during cooling to ambient temperature.

The bar thus treated, which is clear grey in color, and very homogeneous in appearance, is porous enough to be easily reduced to powder by crushing. This powder is subjected to examination by X ray diffraction using a copper anticathode and a nickel filter. The recording of the spectrum obtained presents a group of lines corresponding almost exclusively to the hexagonal solid solution of $\beta'$ sialon. Some broad supplementary lines of very low intensity correspond in certain cases to corundum (in trace state) and in others to the polytype phase usually designated by the symbol 15R. (The latter also in trace state).

Using the first nine lines with the most precise alignment in the recording of the preceding spectrum, the parameters of the $\beta'$ sialon obtained are calculated by a computer and it is found that:

a = 7.685 ± 0.010 Å  C = 2.975 ± 0.009 Å
Volume of the cell: 152.2 ± 0.9 Å$^3$

EXAMPLE 2

A bar is prepared from the same materials as in Example 1 with the same proportions of clay and carbon black but without the addition of sawdust. This bar, subjected to exactly the same treatment as in Example 1, results, after nitriding, in a product whose X-ray diffraction analysis allows principally the mullite 2 $SiO_2.3Al_2O_3$ to be identified, alongside which appear small quantities of silicon oxynitride $Si_2N_2O$ and $\beta$ silicon nitride $Si_3N_4$.

This result, which is entirely different from that of Example 1, clearly shows the crucial part played by the heat-removable pore-generating agent (in this case, sawdust). Without the sawdust, the treated mass remains practically impermeable to nitrogen and the nitriding reaction is only produced on the surface of the sample, whose interior is changed to mullite.

EXAMPLE 3

A bar is prepared from the same materials as in Example 1 containing 75% clay, 20% carbon black and 5% sawdust. This bar, subjected to exactly the same treatment as in Example 1, results, after nitriding, in a product whose X-ray diffraction spectrum is very like that obtained in Example 1. The sialon phase presents practically the same parameters as that of Example 1 although the proportions of corundum and 15R phase are apparently slightly greater. This slight difference between the results of Examples 1 and 3 can be explained by the fact that the proportion of sawdust (the pore-generating agent) which is only 5% in Example 3 is a little too small to provide good access for the nitrogen in the sample to be nitrided. This is why the proportion of 8% of pore-generating agent is considered to be a minimum for the remaining experiments.

EXAMPLE 4

With this example and in most of those which follow, the temperature chosen for the nitriding stage was held at 1500° C. by using a platinum resistance furnace. Although Example 1 showed that a proper preparation of $\beta'$ sialon can be obtained by carrying out nitriding at 1400° C. for 25 hours, it seemed a good idea to try to decrease the treatment time by increasing the temperature.

In addition, because of certain disadvantages of sawdust (in particular as regards the strength of nitrided samples which tend to have a flaky appearance) it has been replaced advantageously by powder obtained by finely grinding olive stones.

The first example of this series (Example 4) concerns the nitriding of the same clay as before (Example 1) which is mixed with the olive stone powder and the carbon black in the following proportions: 70% clay, 14% carbon black and 16% olive stones. Mashing with water allows the same type of nitrided bar to be made according to the same program as in Example 1 except that:

1. the temperature of the nitriding stage is 1500° C.

2. the duration of this stage is 15 hours. X ray diffraction examination of the product obtained shows that the $\beta'$ sialon phase with the same paramenters as those indicated in Example 1 is essentially involved. Practically no corundum is discernible alongside this phase, but there is a small proportion of 15R phase, clearly higher than in the case of Example 1.

EXAMPLE 5

In this example the conditions of Example 4 are exactly reproduced except that the nitriding stage is only 12 hours.

The X ray spectrum of the product obtained is practically the same as in Example 4 except that the quantity of 15R phase is smaller.

EXAMPLE 6

Same conditions as in Example 4 except that the nitriding stage is 9 hours. The X ray spectrum of the product obtained is again very like the previous ones but the 15R phase appears only in trace form and some mullite appears but only in very small quantity.

EXAMPLE 7

Same conditions as in Example 4, except that the nitriding stage is 6 hours. The X ray spectrum of the product obtained is again like the previous ones, but the 15R phase has almost disappeared; the mullite phase, however, is a little greater than in the case of the product of Example 6.

EXAMPLE 8

Same conditions as in Example 4, except that the nitriding stage is only 3 hours.

This time, the X ray spectrum of the product obtained clearly differs from the previous ones. Although the $\beta'$ sialon is still present and its parameters are still the same as those indicated in Example 1, it is accompanied by significant quantities of other phases, principally mullite, corundum, and cristobalite. These phases may therefore be regarded as intermediate phases, appearing when the duration of nitriding is relatively short and no longer detectable in the case of distinctly longer durations of nitriding. Their presence evidences the complexity of the nitriding phenomenon which Reaction 1 represents only in a very simplified generalized form.

It appears from the results of the experiments described in Examples 4 to 8 that the minimum time for nitriding the bar concerned at 1500° C. and transforming it into $\beta'$ sialon (containing only a little 15R phase as impurity) is about 10 hours. Shorter durations result in incomplete reactions which leave intermediate phases in addition to sialon. For lengths of time greater than 10 hours, the X ray diagrams of the powders obtained allow no distinction to be made between products; differences become apparent, however, after sintering of the powders; it has been noted that the longer the preparation period for the sialon powder (duration of the 1500° C. stage) the more it produces dense products after sintering.

EXAMPLE 9

This example is chiefly intended to show that prolonging the duration of the nitriding stage at 1500° C. does not cause the sialon to start decomposing.

Operating in exactly the same conditions as in the previous examples, the duration of the 1500° C. stage was increased to 40 hours. The X ray spectrum of the product obtained is the same as in Example 4 where the nitriding stage was only 15 hours. The fact that 15R phase does not form in greater quantities after 40 hours therefore shows clearly that the sialon formed is completely stable at 1500° C.

Examples 10 and 11 are intended to show that other kaolinitic clays, different in composition from those of the clay used for the first series of examples are also capable of being nitrided to $\beta'$ sialon state.

EXAMPLE 10

A bar with the same dimensions as in Example 1 was made from a kaolinitic clay with a surface area of 52.3 m²/g and with the following composition, expressed by percentages by weight in the raw state: 43.03% $SiO_2$, 35.75% $Al_2O_3$, 0.95% $Fe_2O_3$, 2.21% $TiO_2$, 0.16% MgO, traces of CaO, 0.2% $Na_2O$, 0.08% $K_2O$, 0.01% MnO. This clay presented a loss of 15.58% on firing.

This clay was mixed with carbon black and olive stone powder in the following proportions by weight: 70% clay, 14% carbon black, and 16% olive stone powder.

The bar was treated in the same conditions as that of Example 4. The product obtained seems from its X ray spectrum to be entirely the same as that of Example 4 although with a clearly smaller content of 15R phase. The two clays used in Examples 1 and 10 behave in practically the same way during the nitriding treatment and both produce good quality sialons.

EXAMPLE 11

A bar with the same dimensions as in Example 1 was made from a kaolinitic clay with the following composition, expressed in percentages by weight in the raw state: 55.7% $SiO_2$, 40.2% $Al_2O_3$, 1.05% $Fe_2O_3$, 0.77% $TiO_2$, 0.02% CaO, 0.20% MgO, 0.06% $Na_2O$, 2.0% $K_2O$. This clay presents a loss of 12% on firing.

This clay was mixed with carbon black and sawdust in the following proportions by weight: 70% clay, 14% carbon, 16% sawdust. The bar was treated in accordance with the same program as in Example 1 with one difference, i.e., the nitriding stage was 25 hours at 1500° C.

Examination by X ray diffraction of the product obtained shows that the $\beta'$ sialon phase is essentially involved, with the same parameters as those indicated for Example 1. Only minute traces of corundum and a very small proportion of 15R phase are detectable as additional phases.

EXAMPLE 12

This example concerns the nitriding of an intimate mixture of a very fine and particularly reactive silica with finely divided corundum in proportions which are substantially the same as those of the clays used in the previous examples. A bar of the same dimensions as in Example 1 was made from an intimate mixture comprising by weight: 38% fine silica, 32% finely divided corundum, 14% carbon black and 16% sawdust. Nitriding of the bar was carried out according to the same program as in Example 1 except that the 25 hours long stage was carried out at 1500° C.

Examination by X ray diffraction of the product obtained shows that in addition to the $\beta'$ sialon phase with the same parameters as those indicated in Example 1, a noticeably larger proportion of corundum occurs than in the products obtained by nitriding clay.

EXAMPLE 13

A bar with the same dimensions as in Example 1 was made from an intimate mixture comprising by weight: 40% fine silica, 30% finely crushed corundum, 14% carbon black and 16% olive stone powder. Nitriding of this bar was carried out in accordance with the same programme as in Example 1, except that the nitriding stage was 15 hours at 1500° C.

Examination by X ray diffraction of the product obtained, sufficiently resembling that of the preceding example, showed a substantial proportion of corundum and a little silicon oxynitride $Si_2ON_2$ in addition to the $\beta'$ sialon.

The preceding Examples 12 and 13 are principally intended to illustrate the fact that, by subjecting mixtures of silica and alumina in the same proportions as these two oxides occur combined in clay to nitriding, quite different results are obtained from using clay; the $\beta'$ sialon is still formed but very incompletely since the product obtained contains corundum in large proportions and possibly a little silicon oxynitride.

EXAMPLE 14

This example describes an embodiment on a pilot scale of the method forming the subject of the present invention. Using the same type of clay as in Example 1, an intimate mixture is prepared containing by weight: 70% clay, 14% carbon black, and 16% olive stone powder. From this mixture, mashed with water, parallelipiped bricks are formed which are moulded under a pressure of about 800 kg/cm² and then dried in a drying oven at 110° C. for about ten hours. The dimensions of these bricks after drying are as follows: 230×115×40 mm.

These bricks are placed on the hearth of a bell furnace represented diagrammatically in the accompanying single figure.

The experiment relating to this example is carried out on a mass of 250 kg of bricks but the furnace used with an inner capacity of 0.8 m³ is capable of treating about 500 kg of bricks.

The hearth of the furnace is movable vertically; when it is in a low position, the stack of bricks to be heated can be placed on it and this hearth can then be returned to the base of the furnace. Nitrogen enters at A, in the upper compartment of the furnace and passes through the refractory through passages provided in the crown of the furnace; the gases ($N_2$, CO) leave the furnace via the ducting S. Molybdenum resistances R disposed along the inner walls of the furnace allow the load to be heated. Sealing of the furnace is ensured by a set of hydraulic joints not shown in the diagram. The furnace, traversed by a flow of nitrogen at 20 m³/hour, is heated so as to achieve a steady rise in the temperature of the bricks from ambient to 1500° C. in 20 hours. This temperature of 1500° C. is kept constant from 40 hours and when the heating current is switched off, the furnace cools slowly under the nitrogen current.

The bricks thus treated are clear grey in color after cooling; they are very homogeneous in appearance over their whole mass and they are sufficiently firm to be manipulable without breaking. However, their porosity is such that crushing them is very easy.

Examination by X ray diffraction of the product obtained by crushing of these bricks (whether the sample is taken from the surface or from the core of the brick) shows that the same product as in Example 4 is involved, i.e., essentially $\beta'$ sialon with a little 15R phase and minute traces of corundum.

This example is of interest because it shows that it is possible to carry out a nitriding with a large mass of bricks of considerable size which is as good as the occurring in the small bars used in the laboratory experiments. It can therefore be concluded that it is possible to make several hundred kilos of sialon in one operation.

EXAMPLE 15

This last example is simply intended to show the sintering capacity of the $\beta'$ sialon powder obtained by prolonged milling of the product obtained in Example 4. Small pellets with 35 mm diameter and 8 mm thickness are made by pressing the powder, moistened with a little water, under 1.6 T/cm². After drying in the drying oven (110° C. for some hours) the pellet is placed in a tubular furnace kept at the temperature chosen for sintering, in a nitrogen atmosphere and for a well defined length of time. After this, the pellet is subjected to X-ray crystallographic examination, measurement of porosity and measurement of density. Depending on the durations and temperature of sintering, the results obtained were those recorded in Table 1.

TABLE 1

| Porosity, % | 12.6 | 32 | 15 |
|---|---|---|---|
| Density: | 2.62 | 2.16 | 2.57 |
| Duration of sintering (hours) | 1 | ½ | ½ |
| Sintering temperature (°C.) | 1600 | 1600 | 1650 |

Predictably, these sintered pellets present a porosity which decreases and a density which increases either with the duration or with the temperature of sintering. They also have good mechanical characteristics and, according to X-ray cyrstallographic analysis, are constituted by the $\beta'$ sialon phase free from corundum and containing only a little 15R phase (in very similar proportions to those of the initial powder).

We claim:

1. A method of preparing $\beta'$-sialon products which contain as a single crystalline phase a solid solution of $\beta'$-sialon having the general formula $Si_{6-z}Al_zN_{8-z}O_z$, where z=1 to 4, by the steps comprising
    (1) forming a paste containing a silico-aluminous material, carbon and fine particles of a ligneous pore-forming agent; said ligneous pore-forming agent being present in said paste in an amount of 8 to 18% by weight of the combined weights of the silico-aluminous material, the carbon and the ligneous pore-forming agent; said carbon, when considered together with the carbon contained in the ligneous pore-forming agent, being present in said paste in an amount at least equal to the stoichiometric amount needed for satisfying the equation:

$$\frac{z}{2} Al_2O_3 + (6 - z)SiO_2 + \frac{(8-z)}{2} N_2 + \left(12 - \frac{3}{2} z\right) C \longrightarrow Si_{6-z}Al_zN_{8-z}O_z + \left(12 - \frac{3}{2} z\right) CO$$

where Z=1 to 4;
    (2) forming the paste formed in step (1) into shaped elements;
    (3) drying the shaped elements formed in step (2); and,
    (4) heating the shaped elements which have been dried in step (3) in a nitrogen atmosphere and at temperatures of between 1400° C. and 1600° C. to form the $\beta'$-sialon products.

2. A method according to claim 1, wherein the duration of heating in step (4) is between 9 and 25 hours.

3. A method according to claim 1, wherein the silico-aluminous material is a kaolinitic clay.

4. A method according to claim 1, wherein the total carbon present in the paste is present in a slight excess with respect to said stoichiometric amount.

5. A method according to claim 1, wherein said carbon which is mixed with said silico-aluminous material and said fine particles of pore-forming agent to form said paste is carbon black.

6. A method according to claim 1 wherein water is added to the ingredients forming the paste in step (1).

7. A method according to claim 1, wherein the ligneous pore-forming agent is selected from the group consisting of sawdust and finely crushed olive stones.

8. A method of forming a refractory article which comprises (1) forming a paste containing a silico-aluminous material, carbon and fine particles of a ligneous pore-forming agent; said ligneous pore-forming agent being present in said paste in an amount of 8 to 18% by weight of the combined weights of the silico-aluminous material, the carbon and the ligneous pore-forming agent; said carbon, when considered together with the carbon contained in the ligneous pore-forming agent, being present in said paste in an amount at least equal to the stoichiometric amount needed for satisfying the equation:

$$\frac{Z}{2} Al_2O_3 + (6 - Z)SiO_2 + \frac{(8 - Z)}{2} N_2 + \left(12 - \frac{3}{2} Z\right) C \longrightarrow Si_{6-Z}Al_ZN_{8-Z}O_Z + \left(12 - \frac{3}{2} Z\right) CO$$

where $Z = 1$ to 4;

(2) forming the paste formed in step (1) into shaped elements;
(3) drying the shaped elements formed in step (2);
(4) heating the shaped elements which have been dried in step (3) in a nitrogen atmosphere and at temperatures of between 1400° C. to 1600° C. to form products which contain as a single crystalline phase a solid solution of $\beta'$-sialon having the general formula $Si_{6-Z}Al_ZN_{8-Z}O_Z$, where $Z = 1$ to 4;
(5) crushing the products formed in step (4) to form a powder;
(6) forming the powder formed in step (5) into a desired shape; and
(7) sintering the shape formed in step (6) in the absence of elevated pressure to form the refractory article.

9. A method according to claim 8 wherein water is added to the ingredients forming the paste in step (1).

10. A method according to claim 8, wherein the ligneous pore-forming agent is selected from the group consisting of sawdust and finely crushed olive stones.

11. A method according to claim 8, wherein the duration of heating in step 4 is between 9 and 25 hours.

12. A method according to claim 8, wherein the silico-aluminous material is a kaolinitic clay.

* * * * *